Figure 1:
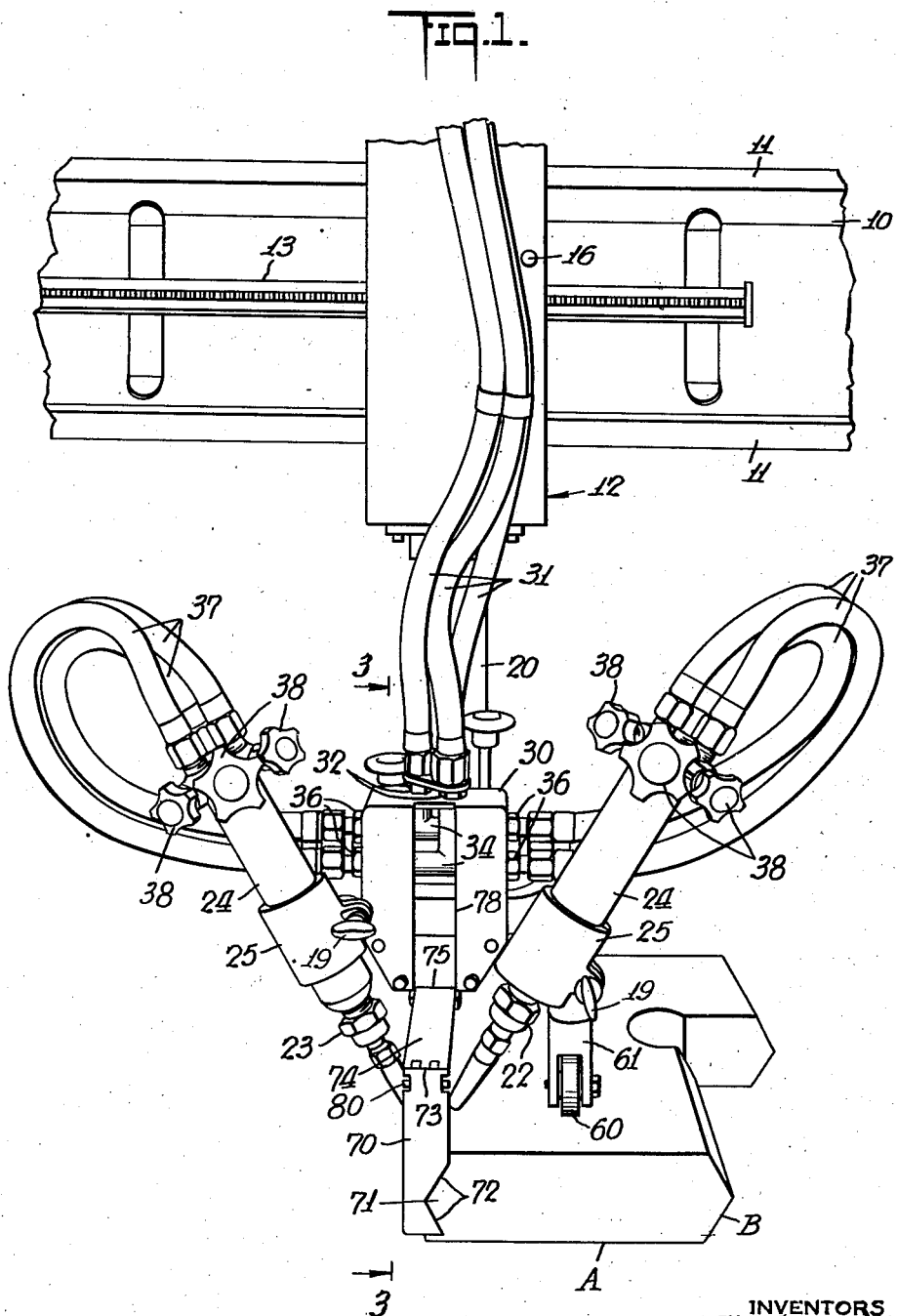

Dec. 10, 1946.  C. MOTT ET AL  2,412,281
TORCH BEVELING APPARATUS
Filed March 26, 1943  2 Sheets-Sheet 1

INVENTORS
Chester Mott
Glenn V. Wallace, Jr.
BY
Dean Fairbanks Hirsch
ATTORNEYS

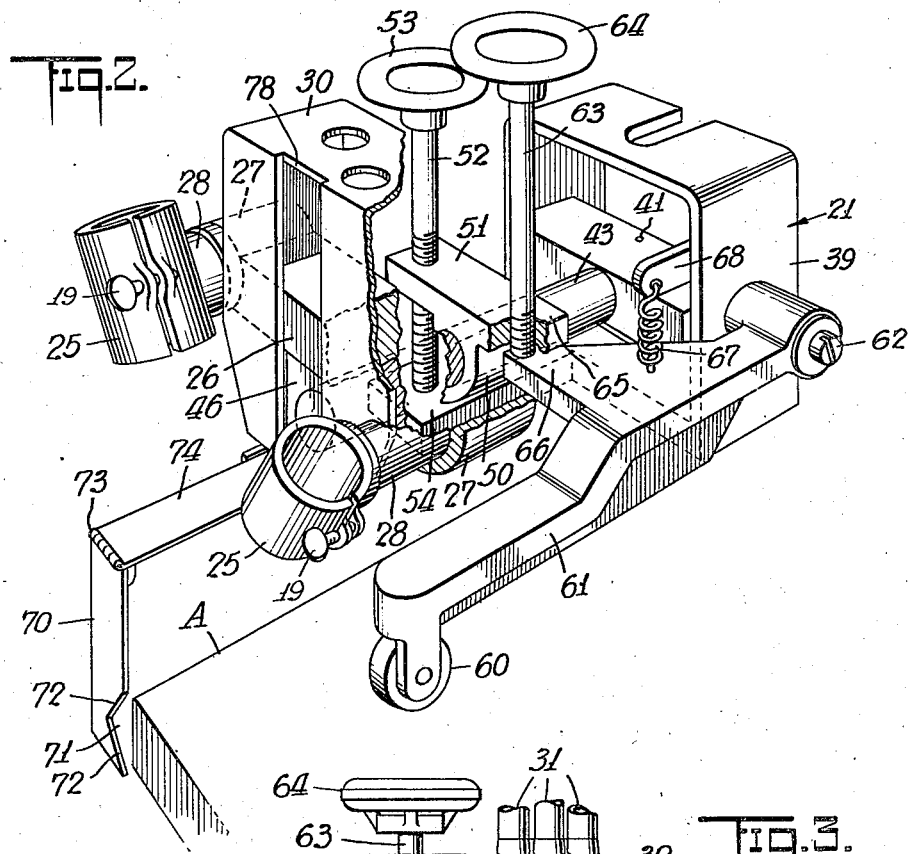

Patented Dec. 10, 1946

2,412,281

UNITED STATES PATENT OFFICE 2,412,281

TORCH BEVELING APPARATUS

Chester Mott, Evanston, and Glenn V. Wallace, Jr., Chicago, Ill., assignors to National Cylinder Gas Company, Chicago, Ill., a corporation of Delaware Application March 26, 1943, Serial No. 480,634

10 Claims. (Cl. 266—23)

1

In one method of butt-welding the edges of two heavy plates together, the two plates have their respective abutting edges doubly beveled to form therebetween on each side of the plates a V-shaped channel into which the welding metal is deposited. In shaping the edges of a plate in preparation for this double V-welding operation, a machine can be employed having a pair of cutting torches angularly arranged to simultaneously cut the double bevel on each plate.

One object of the present invention is to provide a new and improved torch machine for simultaneously cutting the two bevels on the edge of a plate in preparation for a double V-welding operation.

Another object is to provide a double beveling machine having a pair of angularly arranged cutting torches, and having means for conveniently effecting quick adjustments in the elevation of said torches with respect to the plate to be shaped, and the angular position of the two torches as a unit with respect to said plate.

Another object is to provide a beveling machine having two cutting torches with their angular relationship fixed to prevent misadjustment of this relationship by the operator, but having means for adjusting said torches as a unit with respect to the workpiece.

A further object is to provide a beveling machine having pilot means riding over the surface of the workpiece during normal beveling operation to maintain the torches at a predetermined elevation with respect to said surface, and having means whereby said torches are maintained in adjusted position at the beginning or end of a beveling operation, even though this pilot means is not riding over said surface during these end operations.

A further object is to provide a double beveling torch machine having new and improved gauge means by which proper adjustment of the torches with respect to the plate to be beveled can be conveniently and easily ascertained.

Various other objects, features and advantages of the invention will be apparent from the following particular description, and from an inspection of the accompanying drawings, in which Fig. 1 is a front view of a beveling machine embodying the present invention, and shown with its gauge unfolded in operative position for ascertaining proper adjustments of the torches;

Fig. 2 is a perspective view of the beveling machine, with certain parts shown broken and the casing removed;

2

Fig. 3 is a vertical section taken on line 3—3 of Fig. 1, but showing the gauge folded into inoperative position; and Fig. 4 is a fragmentary perspective of the beveling machine.

The beveling machine of the present invention may be mounted for propulsion over the workpiece by any suitable means, as for instance that shown and described in Patent No. 2,269,636, issued January 13, 1942, and in Patent 2,336,596, issued Dec. 14, 1943, on an application filed February 8, 1941. This machine includes a carriage which travels horizontally on tracks over a horizontal table on which may be supported a templet, drawing, pattern or other guide. The carriage projects beyond this table and is provided with a beam 10 having superposed parallel rails 11 extending at right angles to the carriage tracks for supporting a tracing mechanism and one or more torch crosshead units 12, and for guiding them along the carriage in a horizontal direction at right angles to the direction of movement of said carriage.

The tracing mechanism may be of the well-known type, or may be of the form shown in Patent 2,336,626, issued Dec. 14, 1943, on an application filed May 28, 1941, and includes a tracing element in the form of a tracer wheel, pointer, spotlight or the like, which is steered along the outline of the pattern or other guide to be copied or traced. It may be driven by a motor so that it acts as a traction wheel to move the carriage and the torches on the carriage.

The movement of the tracing element along the carriage is transmitted to the torch crosshead units 12 through a connecting bar 13 secured to the tracing mechanism and the crosshead units. With this construction, the actual movement of the tracing element resulting from the movement of the carriage along its supporting tracks and the crosswise movement of the tracing mechanism along the rails 11 is duplicated by each of the crosshead units 12.

Each of the crosshead units 12 is adjustable horizontally along the connecting bar 13 with respect to the tracing mechanism by a racking mechanism shown in the aforesaid Patent 2,336,-626.

A control switch 16 associated with each of the crosshead units 12 can be flipped up or down to move the torches supported on said units vertically upwardly or downwardly through motive power, as shown in Patent 2,336,596. One or more control panels may be also provided for adjusting the horizontal position of the crosshead units 12 with respect to the tracing mechanism, and to adjust vertically the torches on each of the crosshead units.

In the apparatus shown in the aforesaid Patent 2,336,596, each crosshead unit 12 carries a single torch for straight cutting. The beveling unit of the present invention can detachably replace the straight cutting torch in this apparatus. So far as certain aspects of the invention are concerned, this beveling unit may be attached to any other form of traction type cutting machine and may be used on a portable type of cutting machine.

In the specific form of the invention shown, the crosshead unit 12 carries a substantially vertical tube 20 to the lower end of which is removably attached a frame 21 supporting two beveling torches 22 and 23 in fixed angular relationship. These torches 22 and 23 are arranged so that one torch 22 cuts a bevel on the upper half of a plate A or other workpiece to be prepared for welding, while the other torch 23 simultaneously cuts a bevel on the lower half of said plate. The torch 23 is desirably disposed rearwardly of the torch 22 so that the lower bevel is cut by said torch 23 before the upper bevel is cut by said torch 22, assuming that the two torches are propelled rearwardly for cutting. For attaining this sequential relationship between the two beveling operations, the leading torch 23 is about one inch ahead of the follower torch 22.

The cutting operation described forms a double bevel on one edge of the plate A similar to that shown in Fig. 1 on the other edge B of said plate. When two plates with such beveled edges are brought together, they form two reversed V-shaped channels on opposite sides of the plates. Welding metal is deposited in one of the V-channels and then in the other.

The unit illustrated is for beveling the left hand edge (Fig. 1) of plate A. A unit for use on right hand edge would require the right hand torch to be the leading torch and the left hand one to be the follower.

The torches 22 and 23 have respective barrels 24 held in clamps 25 fixed at a given included angle, so that the torches cannot be independently adjusted to vary this included angle, but may be independently adjusted lengthwise of their respective barrels 24 in their clamps 25. For that purpose, the clamps 25 are longitudinally split and provided with respective thumb screws 19 for tightening or loosening said clamps. This independent lengthwise adjustment of the torches 22 and 23 in their respective clamps 25 may be necessary, as for example, when the entire beveling unit is swung about its longitudinal axis as will be described, and one torch strikes the metal, while the other torch is too far away and out of cutting position.

The means for supporting the torches 22 and 23 against relative angular movement desirably includes a bar 26 having sleeves 27 at its opposite sides, and a pair of rods 28 each fixed at one end to its respective torch clamp 25, and retained in said sleeves 27 against endwise and rotational movement. The rods 28, at their opposite ends, are fixed to the sleeves 27 and the torch clamps 25 by any suitable means, as for example, by pinning.

The bar 26 is fixed in any suitable manner to a bracket 30 which latter is desirably in the form of a housing, serving to mount the manifold tubing for the two torches 22 and 23. The main gas supply hose 31 carrying respectively low pressure oxygen, high pressure oxygen and acetylene or other fuel are mounted on the crosshead 12, as for example by the construction shown in Patent 2,356,215, granted August 22, 1944, and are removably connected to respective inlets 32 in the upper plate 33 of the bracket 30. Connected to each of these inlets 32 is a T-fitting 34 extending in the interior of the bracket 30 and having its stems secured to respective inlets 32, and its two branches extending to opposite side bracket walls 35 for connection to outlets 36. The individual hose 37 for the torches 22 and 23 are connected between these manifold outlets 36 and the two torches, so that both torches are supplied from the main supply hose 31. The gas supply to the torch tips is regulated by the valves 38 in the well-known manner.

The inclined torches 22 and 23 are supported for adjusting movement in unison in the respective planes of their lines of cut, to adjust the angles of the two bevel cuts with respect to the workpiece, and are also supported for vertical adjusting movement. For adjustably supporting the torches 22 and 23, the frame 21 is in the shape of an open rectangular case having side walls 39 between and into which are journalled the ends of a pivot or rock shaft 40. Keyed to this shaft 40, as for example by a drive pin 41, is a block 42 extending between the frame side walls 39. An arm 43 in the form of a rod has its rear end extending into and fixed to the block 42, as for example by welding, so that this arm swings with the rock shaft 40 and is held against rotation with respect to said block. The forward end of this rod 43 pivotally and adjustably carries the torches 22 and 23. For that purpose, the forward end of the rod 43 extends with a snug rotative fit into a block 46, which is fixedly retained in and secured to the bracket 30, so that said bracket and the two torches 22 and 23 are rigid with said block 46, and form therewith a unit supported for pivotal movement about said rod 43. For locking this unit in pivotally adjusted position, there is provided a sector or quadrant 44 with a sleeve extension 45 embracing the rod 43 and fixed thereto as for example by welding. The sector 44 has an elongated arcuate slot 47 concentric with the axis of the rod 43 and receiving a locking screw 48 threaded in the bar 26.

To angularly adjust the two torches 22 and 23 in unison about the longitudinal axis of the rod 43, the screw 48 is loosened, and the two torches with the bracket 30, the bar 26, and the block 46 are rotated as a unit about said rod to bring the two torches in desired angular position. The screw 48 is then tightened to lock the torches 22 and 23 in this angular position. In this manner, the angular position of the two torches 22 and 23 can be adjusted, without disturbing the fixed angular relationship between the torches.

Means are provided for maintaining a predetermined spacing of the torches 22 and 23 above the top surface of the workpiece A, irrespective of any variations in said surface. This means includes a pilot wheel 60 adapted to ride over this surface as the machine is horizontally propelled, and rotatably supported at one end of a pivot arm 61, the other end of which is supported on the projecting end 62 of the rock shaft 40 for free rotation about said shaft end. A sleeve 50 is fixed to the rod 43 and has an arm or flange 65 integral or otherwise rigid with the upper section of said sleeve. An upstanding adjusting screw 63, with a handwheel 64 at its upper end, is threaded in the arm 65 of the sleeve 50, and has its lower end bearing against a plate extension 66 of the pivot arm 61. A spring 67 is secured at one end to a lug 68 fixed to the frame 21 and at the other end to the pivot arm 61, and serves to hold said pivot arm against the lower end of the adjusting screw 63. While the pilot wheel 60 is resting on the upper surface of the workpiece A, the weight of the rod 43 and different structures and devices on said rod, including the two torches 22 and 23, causes the adjusting screw 63 to rest on the pivot arm extension 66, so that the elevation of the two torches with respect to said surface depends on the extent to which said screw is threaded into the sleeve arm 65.

After the elevation of the torches 22 and 23 with respect to the pivot arm 61 has been adjusted for cutting, this positional relationship remains constant, so that if the contour of the upper surface of the plate being beveled varies or undulates, the torches 22 and 23 will accurately follow these variations as long as the pilot wheel 60 rides over said surface, thereby giving a correct bevel throughout the length of the cut.

The pilot wheel 60 is positioned halfway between the torches 22 and 23 to transmit as accurately as possible the plate undulations to both of these torches. Therefore, at the beginning or end of the beveling operations, the pilot wheel 60 will be off the surface of the plate being beveled. At other times, as for example while the torches 22 and 23 are being adjusted or while the device is not being used, the pilot wheel 60 may not be resting on a surface. The spring 67 holds the pivot arm 61 against the lower end of the adjusting screw 63, but is not strong enough to support the torches 22 and 23 and associated structure against downward angular gravitational movement about the axis of the rock shaft 40 when the pilot wheel 60 is off a supporting surface.

Means are provided for supporting the torches 22 and 23 when the pilot wheel 60 is off a supporting surface. For that purpose, the sleeve 50 has an arm or flange 51 integral or otherwise rigid with the upper section of said sleeve and extending from said sleeve in a direction opposite to the arm 65. An upstanding adjusting screw 52 threaded in this arm 51 has a hand wheel 53 at its upper end and bears at its lower end on a fixed surface, as for example a surface presented by a forward plate extension 54 of the lower wall of the frame case 21. With this arrangement, when the pilot wheel 60 is off a supporting surface, the torches 22 and 23 with their associated structures 30 and 45 are supported on the frame plate extension 54 through the agency of the screw 52. The elevational distance between the torches 22 and 23 and the pilot arm 61 when the wheel 60 is not resting on a surface depends on the extent to which the screw 52 is threaded into the arm 51. This screw 52 is backed off after starting of the beveling operations, and after the pilot wheel 60 has reached a supporting surface. Otherwise, the pilot wheel 60 as it rides over undulations on the supporting surface of the plate being beveled will raise the torches 22 and 23 beyond a certain level determined by the setting of the screw 52, but will not follow any deep troughs in these undulations.

A removable casing 69 may be provided around and over the rod 43 and the torch adjusting devices 50, 51 and 65 as shown in Fig. 3.

A gauge device for ascertaining the proper adjusted position of the two torches 22 and 23 with respect to the workpiece A includes a gauge plate 70 having a V-shaped notch 71 with its two edges 72 extending at an included angle, as for example 120°, corresponding to the supplement of the angle between the torches 22 and 23, assuming for example that this latter angle is 60°. These two gauge edges 72 show exact intersecting cutting lines of the torches 22 and 23, and therefore give the pattern of the cut.

The gauge plate 70 is arranged to be positioned adjacent the plate edge to be beveled, and is adapted to be folded into the manifold bracket 30. For that purpose, the gauge plate 70 is hinged at 73 to one end of a supporting plate 74, the other end being hinged at 75 to the front of the bracket 30. A rest 76 for the plate 74 and secured to the bracket 30 extends forwardly of said bracket and carries an adjusting screw 77 by which adjustment in the inclination of said plate 74, and in turn the elevation of the gauge notch 71, can be effected. The gauge plate 70 folds over the gauge plate 74, and the two plates fold into a recess 78 at the front wall of the bracket 30.

To limit the angular position of the gauge plate 70 with respect to its supporting plate 74, the underside or front side of said plate has integral or otherwise rigid therewith a stop enlargement 80 defining a shoulder 81 against which the gauge plate 70 abouts in depending position shown in Figs. 1 and 2.

Horizontal adjustment of the torches 22 and 23 is made by moving the crosshead unit 12 along the rails of the carriage as shown and described in Patent 2,336,596. The torches 22 and 23 can be moved vertically into approximate operating position either from one of the control panels or from the individual switch 16, as described in the aforesaid application.

To adjust the elevational position of the torches 22 and 23 with respect to the pilot arm 61, while the beveling device is off or above the plate to be cut, the screws 52 and 63 are turned to make the rod 43 and the pilot arm 61 parallel to the frame plate extension 54. The entire beveling device is then lowered by means of the electrical crosshead 12 or other supporting apparatus which might be employed, until the pilot wheel 60 touches the plate to be cut. In this latter position, the screw 52 is backed off so that the entire weight of the torches 22 and 23 and the associated structures 43 and 30 is supported by pilot wheel 60. While the gauge plate 70 is unfolded down in the position shown in Figs. 1 and 2, and the pilot wheel 60 is resting on the surface of the plate to be cut, the screw 63 is turned to adjust vertically the torches 22 and 23 in the desired position as indicated by the gauge notch 71. After the desired elevational adjustment of the torches 22 and 23 has been made, the screw 52 is brought down to bear on the frame plate 54. The entire beveling device is now moved forward, so that the pilot wheel 60 is no longer resting on the plate to be cut, and the torches 22 and 23 with associated structure 30 and 43 are supported on frame plate 54 through screw 52. The bevel cut is then initiated and the motive power started to move the beveling device towards the left as viewed in Fig. 3. During this movement towards the left, the torches 22 and 23 will be maintained at a constant level until the pilot wheel 60 reaches the surface of the plate being beveled. The screw 52 is then backed off to permit the pilot wheel 60 to automatically control the torch height. When the torches 22 and 23 have almost completed cutting the bevels, the screw 52 is again turned down against the frame plate 54 to support the entire weight of the device as the pilot wheel 60 runs off the end of the plate.

As many changes can be made in the above apparatus, and many apparently widely different embodiments of this invention can be made without departing from the scope of the claims, it is intended that all matter contained in the above description or shown in the accompanying drawings shall be interpreted as illustrative, and not in a limiting sense.

Having thus described our invention what we claim as new and desire to secure by Letters Patent is:

1. In a beveling machine of the type having a cutting torch arranged to cut a workpiece, the combination of a pilot member adapted to ride over the surface of said workpiece during beveling operations and to support said torch while said pilot member is resting on said surface, whereby the elevational movements of said pilot member caused by undulations in said surface are transmitted to said torch, a rotatable member for adjusting the elevation of said torch with respect to said pilot member while said pilot member is resting on said surface, rotatable means operable when said pilot member is off said surface for supporting said torch independently of said pilot member and at a predetermined elevation and for adjusting said last-mentioned elevation.

2. A beveling machine having a frame part, an arm for supporting a beveling torch and mounted for pivotal movement in a vertical plane, a pilot pivot arm adapted to be angularly moved according to variations in the surface of the workpiece to be beveled, cross arms extending from opposite sides of said supporting arm, and adjusting screws threaded into said cross arms respectively, one bearing against said frame part and the other bearing on said pivot arm respectively.

3. A beveling machine having a frame, an arm pivotally supported on said frame, a torch clamp carried thereby, a second arm pivotally supported on said frame, a pilot member carried by said second arm and mounted to ride over the surface of said workpiece during beveling operations, a pair of adjusting screws, and a member secured to said first mentioned arm and having threaded engagement with said screws, one of said screws being adapted to bear on said second mentioned arm and the other screw being adapted to bear on said frame.

4. A beveling machine having a pair of torches arranged at an angle with each other to cut simultaneously the upper and lower bevels on the edge of a workpiece in preparation for a double V-welding operation, a gauge presenting a pair of gauge lines having an included angle corresponding to the supplement of the included angle of said torches and extending in directions conforming with the respective lines of cut of said torches, said gauge being supported for guide positioning adjacent to the workpiece edge to be beveled, and forming a movable unit with said torches, whereby the position of said gauge indicates the position and direction of the lines of cut of said torches, and means for adjusting said torches to adjust the angle of the bevel cuts and the elevation of said cuts with respect to said workpiece as ascertained by the position of said gauge.

5. A beveling machine having a bracket, a pair of torches supported on said bracket and arranged at a fixed angle with respect to each other to cut simultaneously the upper and lower bevels on the edge of a workpiece in preparation for a double V-welding operation, a gauge foldable snugly into said bracket and unfoldable to indicate the positions of the lines of cut of said torches, and means for adjusting the angle of said lines of cut and the elevation of said torches with respect to said workpiece in accordance with the position of said gauge in unfolded position.

6. In a gas cutting machine, a torch carrier movable over a workpiece, a member having one end pivoted on a fixed axis for swinging in a vertical plane, a torch clamp, and means connecting said torch clamp to the other end of said member and including a cross bar pivoted on said member and permitting the bodily swinging movement of said torch clamp in a vertical plane about said member as a pivotal center, means permitting rotation of said torch clamp about an axis parallel to said member, and means permitting the adjustment of said torch clamp in a direction parallel to the axis of said member.

7. In a gas cutting machine, a torch carrier movable over a workpiece, a member having one end pivoted on a fixed axis on said carrier for swinging in a vertical plane, a cross bar pivoted intermediate of its ends on the other end of said member, torch clamps on the ends of said cross bar whereby said torch clamps may be moved in a vertical plane about said member as a pivotal center, means permitting rotation of said torch clamps about axes on said cross bar and parallel to said member, and means permitting the adjustment of said torch clamps in a direction parallel to the axis of said member.

8. In a torch carrying attachment for beveling machines, a member movable endwise in a direction substantially parallel to the edge of a workpiece to be beveled, means at one end of said member pivotally supporting said member and permitting it to swing in a plane at right angles to the surface of said workpiece, a pair of cross bars carried by said member, and a pair of torch supports mounted on opposite ends of one of said cross bars, a pair of adjusting screws on opposite ends of the other of said cross bars, means engaging one of said screws for limiting the downward movement of said member, and means engaging the other of said screws for raising and lowering said member in accordance with variations in the elevation of successive parts of the surface of the workpiece over which the attachment moves.

9. In a torch carrying and guiding attachment for self-propelled beveling machines movable over a workpiece, a pair of arms mounted for pivotal movement about the same axis and in vertical planes, a pilot wheel carried by one of said arms for engaging and moving over the upper surface of the workpiece, a cutting torch support carried by the other of said arms, means for limiting the downward swinging movement of the last mentioned arm, and adjustable connections between said arms for raising or lowering the torch support simultaneously with raising or lowering of said pilot wheel.

10. In a torch carrying and guiding attachment for self-propelled beveling machines movable over a workpiece, a pair of members mounted on said attachment for pivotal movement in separate vertical planes about an axis at right angles to the direction of movement of said attachment, a pilot element carried by one of said members for engaging and moving over the upper surface of the workpiece during the movement of said attachment, a cutting torch support carried by the other of said members, adjustable means between said members for raising and lowering the torch support in respect to said pilot element, and permitting simultaneous raising and lowering of said pilot element and said torch support within predetermined limits, and separate adjustable means for limiting the downward swinging movement of the second mentioned member.

CHESTER MOTT.
GLENN V. WALLACE, JR.